Sept. 30, 1958  R. T. FIELDS  2,854,320

POLYMERIZATION REACTION VESSEL

Filed Dec. 15, 1955

INVENTOR
REUBEN T. FIELDS

BY
ATTORNEY

United States Patent Office 2,854,320
Patented Sept. 30, 1958

2,854,320

POLYMERIZATION REACTION VESSEL

Reuben Thomas Fields, Wilmington, Del., assignor to E. I. du Pont de Nemours and Company, Wilmington, Del., a corporation of Delaware Application December 15, 1955, Serial No. 553,369

2 Claims. (Cl. 23—285)

The present invention pertains to the preparation of high molecular weight solid polymers by a process employing liquid reaction media which are non-solvents for the polymer and gaseous monomers, and in particular to a novel polymerization reactor which may be utilized in the polymerization of gaseous monomers in liquid media forming polymer slurries.

In the polymerization of ethylenically unsaturated monomers in liquid reaction media conditions are often used at which the polymer is not soluble in the reaction medium and at which the monomer is only slightly soluble in the medium. Such a polymerization has many advantages such as the ease of separating the polymer from the reaction mixture, and the control over the rate of polymerization through the low solubility of the monomer in the medium which permits the presence of large quantities of highly compressed monomer in the reaction vessel. Examples of such polymerizations are the aqueous polymerization of tetrafluoroethylene or the room temperature polymerization of ethylene in hydrocarbon media. In the polymerization of gaseous monomers and even liquid monomers employing conventional polymerization reactors it was found that polymer formation occurred on the walls of the reactor which were not continuously wetted by the liquid medium or where there was insufficient agitation such as in corners of a reactor. The formation of such so-called adhesion polymer presents a maintenance problem which is both costly and time consuming since it becomes necessary to clean out the reactor periodically to avoid plugging of lines, thus interrupting production. In many instances such adhesion polymer is not of the same type or quality as the polymer made in the slurry and thus has to be discarded or separately sold. In the polymerization of gaseous monomers which are only slightly soluble in the reaction medium it is important to provide intimate contact between the gas and the liquid. In many of the conventional reactors the agitation provided by an impeller causes circumferential swirling action of the reaction mixture. Such agitation was found to be insufficient to give even rates of polymerization necessary for continuous processes, and often failed to provide adequate temperature control for a continuous process.

It is therefore the object of the present invention to provide a novel type of polymerization reactor. It is a further object of the present invention to provide a polymerization vessel which does not form adhesion polymer. Yet another object of the present invention is to provide a polymerization reactor in which the reaction mixture is circulated at a high velocity in a streamlined flow pattern. It is still a further objective of the invention to provide a polymerization reactor for the polymerization of gaseous monomers wherein the surface of the reactor is substantially and continuously covered by the reaction medium without decreasing the volume of the gas space required for the monomer. Other objects will become apparent hereinafter.

It has now been found that a polymerization reactor which remains free of adhesion polymer formation and which results in good temperature control and a high velocity streamlined flow pattern is obtained if a vertically cylindrical reactor is constructed with toroidally shaped ends wherein the lower end contains in its annular concave section radial vanes and wherein the reaction mixture is forced by the rapidly rotating blades of an impeller which is concentrically aligned with and adjacent to the lower toroidally shaped end, into the concave section of the lower end. Under the impetus of the impeller or agitator the reaction mixture is forced downward into the concave section of the bottom and substantially vertically upwards along the walls of the reactor into the upper concave section of the reactor, where the reaction mixture forming a vortex draws in additional medium and/or monomer. The reaction then falls back onto the impeller, thus creating a circulating flow pattern. The vanes in the lower toroidally shaped end substantially prevent circumferential flow of the reaction mixture resulting from the rotating impeller which would otherwise impede the upward flow of the reaction mixture. The circulating reaction mixture, therefore, flows at high velocity over substantially all of the surfaces of the reactor without eliminating the gas space required for the monomer and in addition provides for a large amount of turbulence in the center of the reactor. When using the above-described reactor in the polymerization of gaseous monomers which form polymer medium slurries, it was found that through the streamlined, high velocity flow of the reaction mixture, covering substantially all of the surfaces of the reactor, the formation of adhesion polymer was completely avoided.

The reactor of the present invention is further illustrated by the accompanying drawings.

Figure 1:
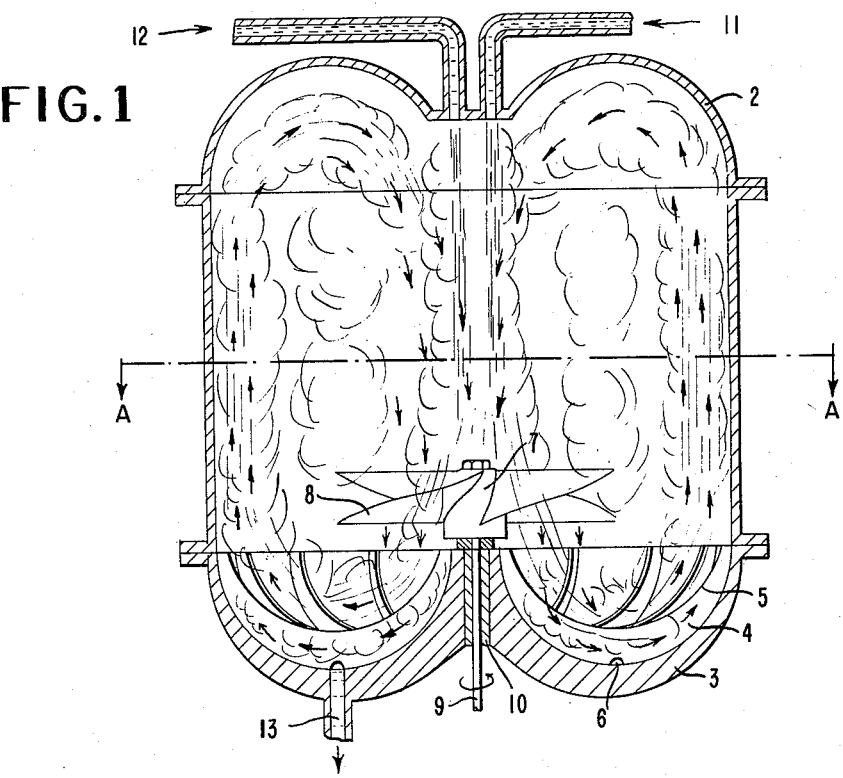
Figure 1 is a vertical cross-section of the polymerization reactor.
Figure 2:
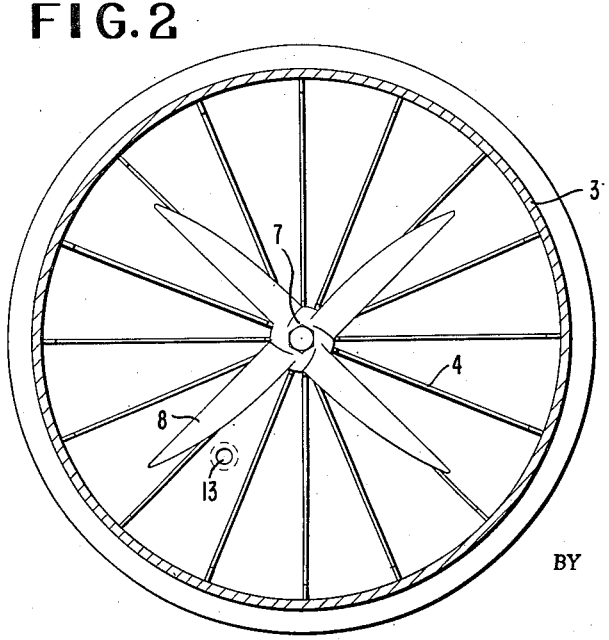
Figure 2 is a horizontal cross-section of the reactor along the line A—A of Figure 1.

Referring to the drawings the reactor comprises an outer cylindrical shell 1 to which is attached the toroidally shaped upper end 2 and the similarly shaped lower end 3. The actual geometric configuration of the concave section, i. e. the curvature, may be varied without significantly affecting the function of the toroidal end, which is to reverse the direction of the flow with a minimum loss of force. Into the lower end are set a multiplicity of equidistantly placed radial vanes 4. The construction and the number of the vanes may be varied within limits. The vanes should be at least high enough to pierce the circumferential flow pattern resulting from the agitator and direct the flow of the reaction mixture outward. The upper edge of the vane 5 may follow the geometry of the concave section or may be a straight line across the upper edge of the toroidal section or a combination of both. The vane may be vertical on both sides as illustrated in the drawings, or may be vertical on the side against which the reaction mixture is pushed by the rotational force of the agitator and sloped on the other side. In the lower extremity, the vanes may be cut out 6 to permit flow between the reactions, when draining the reactor through the polymer slurry outlet 13.

The propeller agitator 7 may be of any shape and is rotated in the direction in which the pitched blades 8 will cause a downward flow of the reaction medium. The diameter of the blade should not be so large as to interfere with upward flow of the reaction mixture. The agitator is rotated by the shaft 9 which is positioned by the bearing 10 and driven by some suitable source of power such as an electric motor. Feed inlets for the supply of monomer 11 and additional reaction medium 12 containing the catalyst are arranged in the center of the toroidally shaped top. By placing the process ingredient feed inlets in the center of the toroidally shaped top, gaseous monomer and/or reaction mixture are drawn into the vortex formed at this point by the circulating reaction mixture.

For polymerization reactions to be carried out at elevated temperatures heating means may be suitably attached to the cylindrical shell of the reactor. The rapidly circulating flow of the reaction mixture insures a good heat exchange. Similarly, means for refrigeration may be employed for low temperature polymerizations.

The method of operation of the reactor in accordance with the present invention is as follows: The reactor is filled to ½ to ⅔ with the reaction medium containing the catalyst. The agitator is placed into operation causing the liquid medium to circulate around the walls of the reactor. The reactor is then pressured with the gaseous monomer to the desired pressure and heated to the predetermined temperature. As the pressure is decreased, additional monomer is added to maintain the pressure. As the product is withdrawn, additional medium is added to the reaction mixture, thus resulting in a continuous process. At the end of the run the reactor is then drained of the resulting polymer slurry. No adhesion polymer is formed on the blades or the vanes of the reactor because of the high velocity with which the reaction mixture is circulating.

The present invention is applicable in the preparation of any high molecular weight polymer and is particularly useful in the polymerization of gaseous monomers in a liquid medium having therein dissolved a polymerization initiator to form polymer slurries. The reactor of the present invention is suitable for a batch polymerization and a continuous polymerization. The reactor may be used at high or at low temperatures and over a wide range of pressures. The reactor of the present invention may be built out of any material substantially inert to the reagents and polymers produced, such as glass, stainless steel, steel lined with a noble metal, etc.

The polymerization reaction vessel of the present invention provides a method whereby substantially all of the surfaces of the vessel are covered by the reaction medium without eliminating the free space necessary for the polymerization of gaseous monomers, and thereby the formation of undesirable polymer is prevented. The present invention further provides a high velocity streamlined flow for the reaction mixture along the reactor walls necessary for good polymerization rates in the polymerization of gaseous monomers.

I claim:

1. An improved reaction vessel for the polymerization of gaseous monomers in liquid media, comprising a closed vessel consisting of a cylindrical vertical wall in combination with two ends, said ends having the shape of a bisected toroid, the annular concave section of the lower semi-toroidally shaped end containing a multiplicity of radial vanes, an agitator impeller exerting a downward pressure on said liquid, said agitator impeller being concentrically aligned with, above and adjacent to the said lower end, means for feeding the process ingredients, means for removing the product formed and means for supplying sufficient power to force said liquid in a toroidal flow.

2. The reaction vessel, as set forth in claim 1, wherein the means for introducing the process ingredients are in the center of the upper end, and the means for removing the product formed are at the lowest point of the concave section of the lower end.

References Cited in the file of this patent

UNITED STATES PATENTS

| 1,430,362 | Devereux | Sept. 26, 1922 |
| 2,265,936 | Cowles | Dec. 9, 1941 |
| 2,436,767 | Gerlicher | Feb. 24, 1948 |